United States Patent
Peddi et al.

(10) Patent No.: US 12,485,776 B2
(45) Date of Patent: Dec. 2, 2025

(54) DIRECT DISCRETE-TIME CURRENT CONTROLLER FOR VIRTUALLY-TRANSLATED ALTERNATING CURRENT MACHINE

(71) Applicant: GM GLOBAL TECHNOLOGY OPERATIONS LLC, Detroit, MI (US)

(72) Inventors: Vinod Chowdary Peddi, Shelby Charter Township, MI (US); Anmol Aggarwal, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 445 days.

(21) Appl. No.: 18/331,338

(22) Filed: Jun. 8, 2023

(65) Prior Publication Data
US 2024/0408980 A1  Dec. 12, 2024

(51) Int. Cl.
*B60L 50/51* (2019.01)
*H02M 1/00* (2006.01)
*H02M 7/5387* (2007.01)

(52) U.S. Cl.
CPC .......... *B60L 50/51* (2019.02); *H02M 1/0012* (2021.05); *H02M 7/53873* (2013.01); *B60L 2210/40* (2013.01); *B60L 2240/423* (2013.01); *B60L 2240/427* (2013.01)

(58) Field of Classification Search
CPC .......... B60L 2210/40; B60L 2240/423; B60L 2240/427; B60L 50/51; H02M 1/0012; H02M 7/53873; H02P 21/16; H02P 27/08; H02P 21/22
See application file for complete search history.

(56) References Cited

U.S. PATENT DOCUMENTS

| | | | |
|---|---|---|---|
| 8,816,618 B2 * | 8/2014 | Fujii | H02P 21/0003 318/700 |
| 9,007,009 B2 * | 4/2015 | Omata | H02P 21/14 318/504 |
| 9,211,806 B2 * | 12/2015 | Perisic | B60L 15/025 |
| 11,699,971 B2 * | 7/2023 | Oi | B60L 50/51 318/400.3 |
| 2023/0099460 A1 | 3/2023 | Peddi et al. | |

* cited by examiner

*Primary Examiner* — Thai T Dinh
(74) *Attorney, Agent, or Firm* — Quinn IP Law (57) ABSTRACT

An electric drive system of a motor vehicle or another battery electric system includes a power inverter module (PIM) connected to a DC power supply, an alternating current (AC) motor connected to the PIM and to a load, and a controller. The motor is a salient machine. Control logic of the controller includes a plant model of the electric drive system. The plant model includes an asymmetric time constant of the motor. The controller selectively modifies the asymmetric time constant via selective and independent operating point-specific manipulation of direct axis (d-axis) and quadrature axis (q-axis) inductance and resistance. The asymmetric time constant is virtually translated in the control logic into a symmetric modified time constant by manipulating or adding virtual inductive and virtual resistive terms independently and per operating point. The controller controls the motor at the operating point using the symmetric modified time constant.

20 Claims, 7 Drawing Sheets

DIRECT DISCRETE-TIME CURRENT CONTROLLER FOR VIRTUALLY-TRANSLATED ALTERNATING CURRENT MACHINE

INTRODUCTION

A rotary electric machine, when embodied as a single-phase or a polyphase alternating current (AC) motor having a rotor and a stator, may be connected to a direct current (DC) power supply via an intervening inverter. Individual ON/OFF conducting states of resident semiconductor power switches of the inverter are individually commanded using pulse-width modulation or another application-suitable high-frequency switching control technique. This action ultimately converts a DC input voltage from the power supply into an AC output voltage. The AC output voltage is then applied to the stator windings of the AC motor to cause rotation of the rotor and an output member connected thereto.

An electric machine may be constructed in such a way that the inductance of the stator windings varies as a function of rotor position. This is primarily due to a non-uniform stator-rotor airgap. Unlike higher-speed symmetric/non-salient machines in which the stator-rotor airgap is uniform and the direct axis (d-axis) and quadrature axis (q-axis) inductances are the same, asymmetric/salient machines are more commonly used in lower-speed applications. An interior permanent magnet (IPM) synchronous machine and a synchronous reluctance machine are examples of salient electric machines. The presence of asymmetry or saliency greatly complicates the motor control task. This in turn requires the use of specialized control logic, sensing, and digital signal processing techniques. Asymmetric machines are thus relatively difficult to analyze and control in real-time using classical controls techniques.

SUMMARY

Disclosed herein are control systems and related methodologies for controlling a salient/asymmetric alternating current (AC) motor, e.g., an electric traction motor of an electrified powertrain system or an AC motor of another battery electric system. As appreciated in the art, classical motor controls methods, if applied to the real-time control of an asymmetric machine, may lead to command tracking errors, as well as relatively poor disturbance rejection and motor performance at low fundamental-to-sampling ratios. The present solutions are therefore intended to extend the myriad benefits of virtual translation-more commonly used to the control symmetric/non-salient machines-to the control of asymmetric/salient machines. The resulting control system enables high-speed salient machines to be used in a wider range of applications, with higher-bandwidth torque production. The present solutions also enable selective and independent rejection of high-frequency and low-frequency disturbances per operating point of the AC motor.

An electric drive system in accordance with an exemplary embodiment of the present disclosure includes a direct current power supply, e.g., a multi-cell electrochemical battery pack, and an inverter that is connected to the power supply. The electric drive system also includes the above-summarized AC motor and an associated motor controller. The AC motor is connectable to a load and to the inverter, the latter of which is referred to hereinafter as a power inverter module (PIM). The load for its part could be embodied as a set of road wheels in a non-limiting embodiment in which the aforementioned electric drive system is used as part of a motor vehicle.

The AC motor contemplated herein has an asymmetric time constant. The controller is programmed to selectively modify this asymmetric time constant at predetermined operating points of the AC motor, e.g., torque and speed operating points. This control action occurs in logic of the controller via independent manipulation of the AC motor's direct axis (d-axis) and quadrature axis (q-axis) inductance and impedance values, such that the asymmetric time constant is virtually modified or translated into a symmetric time constant within the control logic. In particular, the time constant is virtually modified to be symmetric by manipulating/adding virtual inductive and virtual resistive terms independently and per operating point, as set forth in detail herein.

The controller may be configured to determine a torque command and an angular speed of the AC motor, in which case the operating point of the AC motor includes the torque command and the angular speed of the AC motor. The electric drive system in one or more embodiments may be part of a mobile system aboard which the AC motor is operable as a traction or propulsion motor.

The controller may include a computer-readable storage medium that includes a first lookup table and a second lookup table each indexed by the torque command and the angular speed of the AC motor. In such an embodiment, the symmetric modified time constant may be selected by the controller from the first lookup table and used to calculate the virtual d-axis resistance and the virtual q-axis resistance as the virtual resistive terms. A d-axis constant multiplier and a q-axis constant multiplier may be selected by the controller from the second lookup table and used to calculate the virtual d-axis inductance and the virtual q-axis inductance as the virtual inductive terms.

The controller in a possible implementation is configured to calculate the virtual d-axis inductance and the virtual q-axis inductance by multiplying a d-axis dynamic inductance and a q-axis dynamic inductance by the d-axis constant multiplier and the q-axis constant multiplier, respectively.

In one or more embodiments, the controller selectively rejects a low-frequency disturbance of the electric drive system by replacing the d-axis inductance and/or the q-axis inductance in the plant model with the virtual d-axis inductance and/or the virtual q-axis inductance from the second lookup table, respectively. The same controller could selectively reject a high-frequency disturbance of the electric drive system by replacing the d-axis resistance and/or the q-axis resistance of the plant model with the virtual d-axis resistance and/or the virtual q-axis resistance from the first lookup table, respectively.

Another aspect of the disclosure includes a method for controlling an electric drive system having an AC motor connected to a PIM and to a load. The AC motor is a salient machine. The method in a possible implementation includes determining an operating point of the AC motor and selectively modifying an asymmetric time constant of the AC motor at the operating point of the AC motor in control logic of the controller. The control logic includes a plant model of the electric drive system. The method includes selectively and independently manipulating a d-axis and q-axis inductance and resistance via the controller, such that the asymmetric time constant is virtually translated in the control logic into a symmetric modified time constant by manipulating/adding virtual inductive and virtual resistive terms independently and per operating point of the AC motor. The method also includes controlling the AC motor at the operating point using the symmetric modified time constant.

A motor vehicle is also disclosed herein, with the motor vehicle including one or more road wheels and an electric drive system connected to the vehicle body. The electric drive system includes a traction battery pack, a PIM connected to the traction battery pack, an AC traction motor connected to the PIM and to one or more of the road wheels, and a controller configured to perform the above-summarized method or variations thereof. The AC traction motor is a salient machine. The controller is programmed with control logic including a plant model of the electric drive system, with the plant model including an asymmetric time constant of the AC motor.

The above features and advantages, and other features and advantages, of the present teachings are readily apparent from the following detailed description of some of the best modes and other embodiments for carrying out the present teachings, as defined in the appended claims, when taken in connection with the accompanying drawings.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Figure 1:
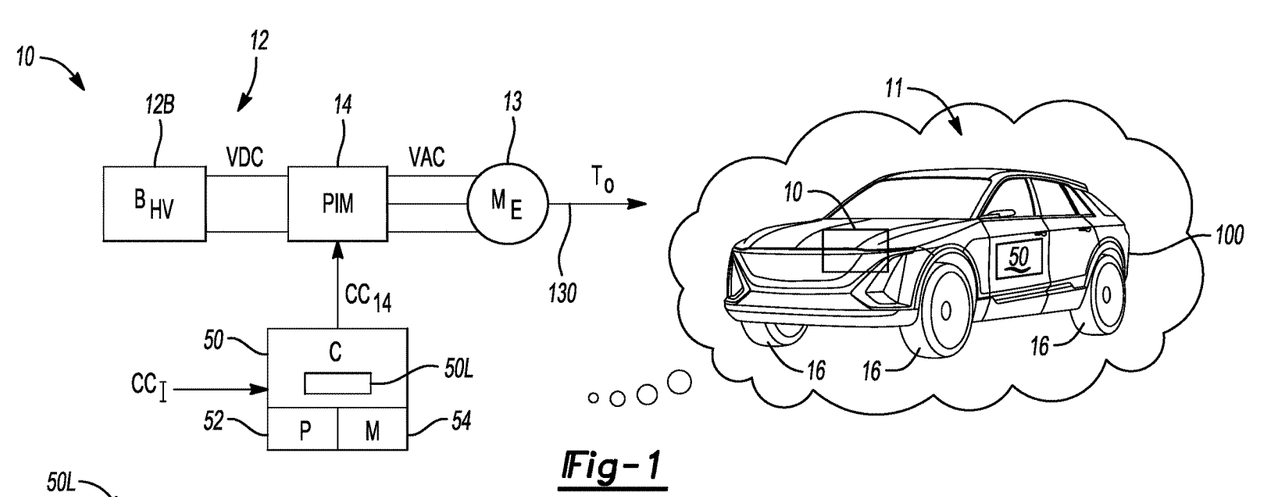
FIG. 1 illustrates a representative motor vehicle equipped with an electric drive system in accordance with an aspect of the present disclosure.

Referring to the drawings, wherein like reference numerals correspond to like or similar components throughout the several Figures, FIG. 1 illustrates a vehicle body 100 of a motor vehicle 11. An electric drive system 10 is connected to the vehicle body 100. In other mobile or stationary battery electric systems, including aircraft, rail vehicles, boats and other watercraft, farm equipment, power plants, hoists, conveyor systems, etc., the electric drive system 10 could be connected to structure other than the vehicle body 100.

Therefore, the motor vehicle 11 of FIG. 1 is just one possible implementation of the electric drive system 10, with the motor vehicle 11 used hereinafter for illustrative consistency as a host battery electric system that would benefit from the present control strategy.

The electric drive system 10 in the embodiment of FIG. 1 includes a high-voltage power supply 12 and an alternating current (AC) motor (ME) 13. The AC motor 13 as contemplated herein is an asymmetric/salient pole machine of the type summarized above. For example, the AC motor 13 could be implemented as an interior permanent magnet (IPM) synchronous motor. The electric drive system 10 and its AC motor 13 may be modeled as a physical plant having an asymmetric time constant. Using the control logic, this asymmetric time constant is modified or virtually translated in real-time within control logic 50L of a resident electronic motor control unit, hereinafter a controller (C) 50 for simplicity. This action renders the time constant symmetric, and occurs by changing the direct axis (d-axis) and quadrature axis (q-axis) inductance and resistance (impedance) of the AC motor 13 on an operating point-specific basis. Exemplary implementations of the control logic 50L are set forth in detail herein with reference to FIGS. 2-7.

The power supply 12 in the non-limiting embodiment of FIG. 1 is configured as a multi-cell electrochemical propulsion or traction battery pack ($B_{HV}$) 12B, e.g., a lithium-ion, nickel-metal-hydride, etc. In such an embodiment, the term "high-voltage" may encompass battery voltages of about 300 volts or more, i.e., a voltage level suitable for vehicular propulsion. The electric drive system 10 also includes at least one power inverter module (PIM) 14 configured to convert a direct current voltage (VDC) from the traction battery pack 12B into an alternating current voltage (VAC) suitable for energizing the AC motor 13, which in the exemplary embodiment of FIG. 1 is configured as an electric traction motor.

Representative hardware components of the electric drive system 10 of FIG. 1 include the battery pack 12B, the AC motor 13, and the PIM 14. The AC motor 13 includes a rotatable output member 130 coupled in the illustrated embodiment to one or more of the road wheels 16. The AC traction motor 13 when energized generates output torque ($T_O$), which is then directed to one or more road wheels 16 of the motor vehicle 11. Although omitted for illustrative simplicity, those skilled in the art will appreciate that alternative configurations of the electric drive system 10 could include more than one AC motor 13 and possibly more than one PIM 14.

During drive modes of the motor vehicle 11, the PIM 14 is controlled by the controller 50 via pulse width modulation (PWM) or another application-suitable high-frequency switching control technique. The controller 50 may transmit PWM switching control signals ($CC_{14}$) to the PIM 14 to energize the AC motor 13. As appreciated in the art, solid-state power switches located within the PIM 14 are constructed as semiconductor switching device, e.g., insulated gate bipolar transistors (IGBTs), metal oxide semiconductor field-effect transistors (MOSFETs), thyristors, or other electronic power switches having controllable conducting (ON) modes and blocking (OFF) modes commanded and set by the PWM switching control signals ($CC_{14}$).

Although omitted from FIG. 1 for illustrative simplicity, those skilled in the art will appreciate that the electric drive system 10 may include additional electrical components for powering various systems or functions aboard the motor vehicle 11. For example, the traction battery pack 12B could be connected to a DC-DC converter suitable for reducing a voltage level of the traction battery pack 12B, e.g., 300V or more as noted elsewhere above, to a typical 12-15V auxiliary voltage level. An auxiliary battery such as a lead-acid auxiliary battery could be electrically connected to such a DC-DC converter, with internal switching operation of the DC-DC converter ensuring that the auxiliary battery remains charged, or that one or more low-voltage systems aboard the motor vehicle 11, e.g., a radio, lighting, display screen, etc., are provided with power sufficient for energizing their respective functions.

Within the scope of the present disclosure, the controller 50 illustrated in FIG. 1 is programmed to act as a direct discrete time current controller of the virtually-translated AC motor 13. To that end, one or more processors (P) 52 of the controller 50 are configured to receive input signals ($CC_1$) and, in response thereto, to execute the present method 50M (see FIG. 6) as an algorithm or algorithms. Computer-readable code or instructions for implementing such a method 50M may be stored in memory (M) 54, including tangible, non-transitory computer-readable storage medium, e.g., magnetic or optical media, CD-ROM, and/or solid-state/semiconductor memory (e.g., various types of RAM or ROM).

The term "controller" and related terms such as control module, module, control, control unit, processor, and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). Non-transitory components of the memory 54 are those which are capable of storing machine-readable instructions in the form of one or more software or firmware programs or routines, combinational logic circuit(s), input/output circuit(s) and devices, signal conditioning and buffer circuitry and other components that can be accessed by the processor(s) 52 to provide the described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example about 50-100 microsecond (ms) intervals during ongoing operation. Alternatively, routines may be executed in response to occurrence of a triggering event.

Figure 2:
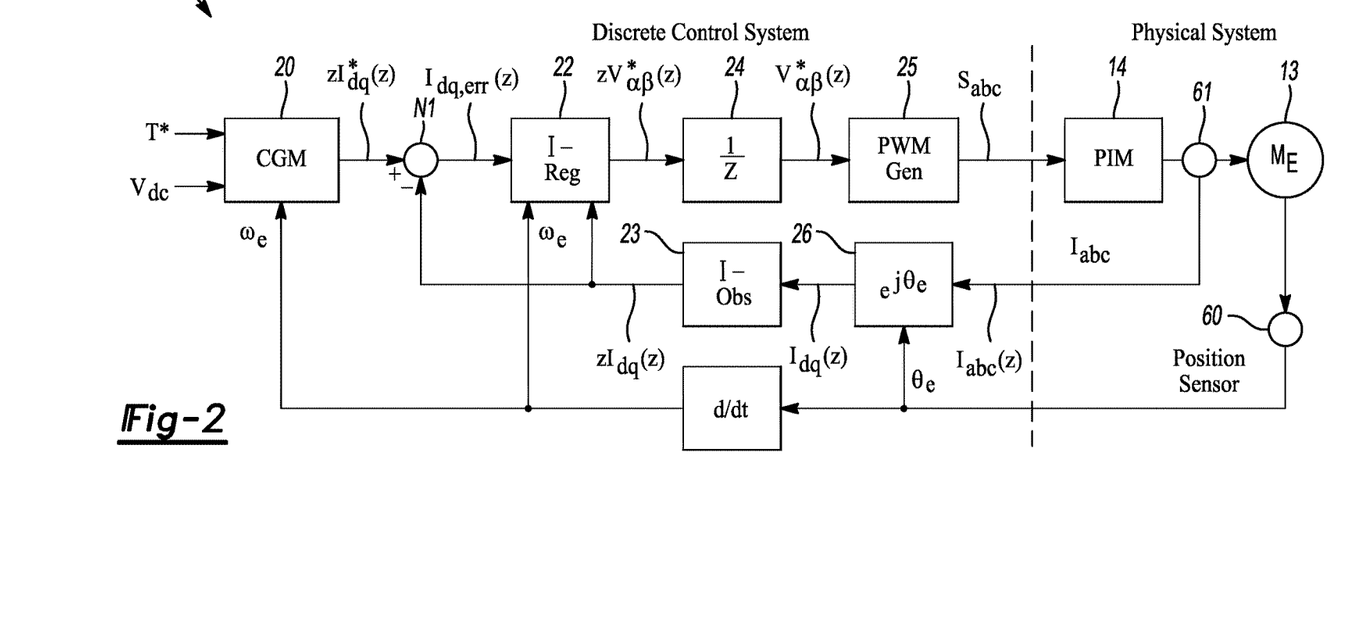
FIG. 2 is a block diagram of the portions of the electric drive system and controller of FIG. 1, with the controller configured to selectively translate an asymmetric time constant as part of the present motor control strategy.

Referring to FIG. 2, an asymmetric AC machine such as the illustrated AC motor 13 tend to be difficult to properly analyze and control using the classical motor control techniques common to symmetric/non-salient machines. Using the controller 50 of FIG. 1, the control logic 50L of FIG. 2, and the method 50M of FIG. 6 as set forth below, the controller 50 is able to virtually modify the time constant (t) of the electric drive system 10 (the physical plant), where t is the inductance (L) divided by the resistance (R), in an operating point-specific manner. Doing so "virtually translates" this otherwise asymmetric time constant into a symmetric time constant. The present approach also allows the controller 50 of FIG. 1 to use a classical pole-placement type design to enable higher-speed use of the AC motor 13 and provide other attendant benefits.

Aspects of the control logic 50L are illustrated in block diagram form in FIG. 2, with the control logic 50L enabling the controller 50 of FIG. 1 to function as a discrete control system. The control logic 50L includes a command generation module (CGM) 20 that receives as part of the input signals (CCI) of FIG. 1: (i) a commanded torque T*, where the superscript "*" here and elsewhere in FIG. 2 indicates a value commanded by the controller 50, and (ii) a measured or reported battery voltage ($V_{dc}$) of the battery pack 12B shown in FIG. 1 and its associated DC voltage bus. As appreciated by those skilled in the art, the torque command (T*) may be calculated by the controller 50 in response to user inputs, e.g., accelerator and brake pedal inputs and/or autonomously-generated inputs in different embodiments of the motor vehicle 11, for instance by mapping accelerator and brake pedal positions to the torque command (T*), and then translating the torque command (T*) to a required axle torque command for powering one or more of the road wheels 16 via the AC motor 13, in this instance functioning as a propulsion or traction motor. The CGM 20 ultimately generates d-axis and q-axis current commands, collectively represented in FIG. 2 as $zI^*_{dq}(z)$, as a vector quantity. As appreciated in the art, $zI^*_{dq}$ is implied as $k+1^{th}$ quantity.

Constituent components of the control logic 50L include a current regulator (I-Reg) 22 and a current observer (I-Obs) 23. As appreciated in the art, the current regulator 22 is ultimately responsible for controlling current to stator windings of the AC motor 13 via operation of the PIM 14. As part of this task, the current regulator 22 considers an angular speed ($\omega_e$) of the AC motor 13, e.g., as a derivative (d/dt) of a measured angular position ($\theta_e$) of the AC motor 13, with the measured angular position ($\theta_e$) being determined using a suitable position sensor 60, for instance an encoder or resolver. The current regulator 22 ultimately receives an error signal ($I_{dq.err}(z)$) from a computation node N1, the angular speed ($\omega_e$) of the AC motor 13, and a calculated d-axis and q-axis current ($zI_{dq}(z)$) from the current observer 23, which for its part receives the d-axis and q-axis current vector ($I_{dq}(z)$) as an input and generates the above-noted value $zI_{dq}(z)$ for use by the current regulator 22.

The current regulator 22 of FIG. 2 outputs or requests a d-axis and q-axis voltage command ($zV^*_{\alpha\beta}(z)$), which is processed via delay block 24 ("½"), wherein 1/Z is the unit delay, to produce the commanded voltage $V^*_{\alpha\beta}(z)$ as an input to a PWM generation block (PWM Gen) 25. In the nominal "abc" reference frame of a representative 3-phase embodiment of the AC motor 13, switching control signals ($S_{abc}$) analogous to the switching control signals ($CC_{14}$) of FIG. 1 are used by the PIM 14 to energize the AC motor 13 of the physical system.

Measured or reported a, b, and c phase currents from a current sensor(s) 61, i.e., $I_{abc}$, are then fed into a transformation block ($e^{j\theta_e}$) 26 as an input $I_{abc}(z)$, along with the measured angular position ($\theta_e$) of the AC motor 13. The transformation block 26 ultimately outputs the d-axis and q-axis current vector ($I_{dq}(z)$) as an input to the current observer 23 as set forth above. Thus, current control features of the control logic 50L shown in simplified block diagram form in FIG. 2 determines a current command for the AC motor 13 while performing abc-to-dq conversion in a closed-loop as shown.

Figure 3A:
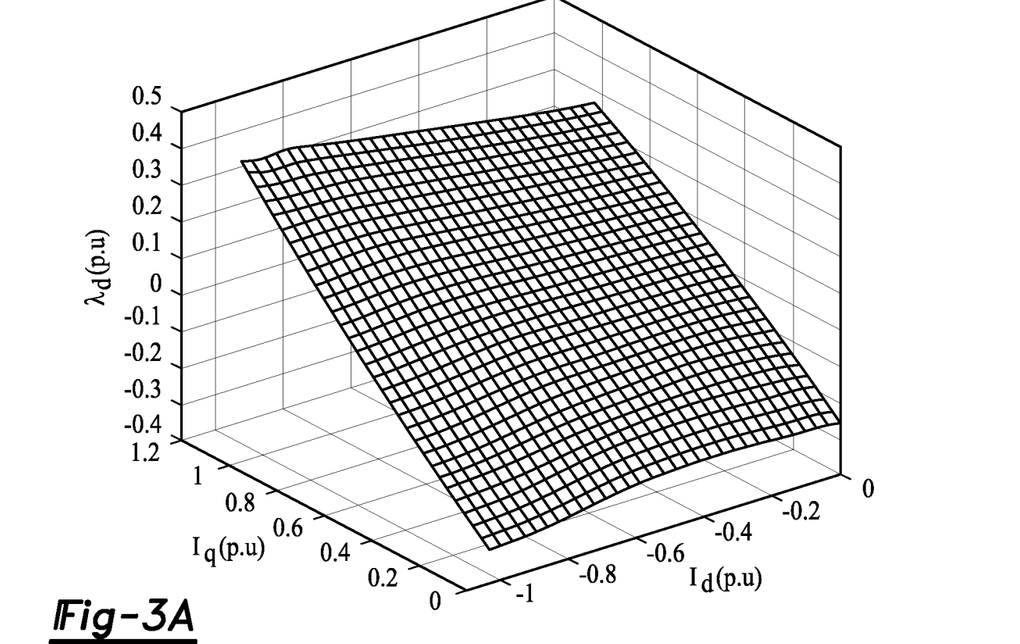
FIGS. 3A and 3B together illustrate direct axis (d-axis) and quadrature axis (q-axis) flux saturation characteristics of a representative asymmetric AC motor as depicted in FIGS. 1 and 2.
Figure 3B:
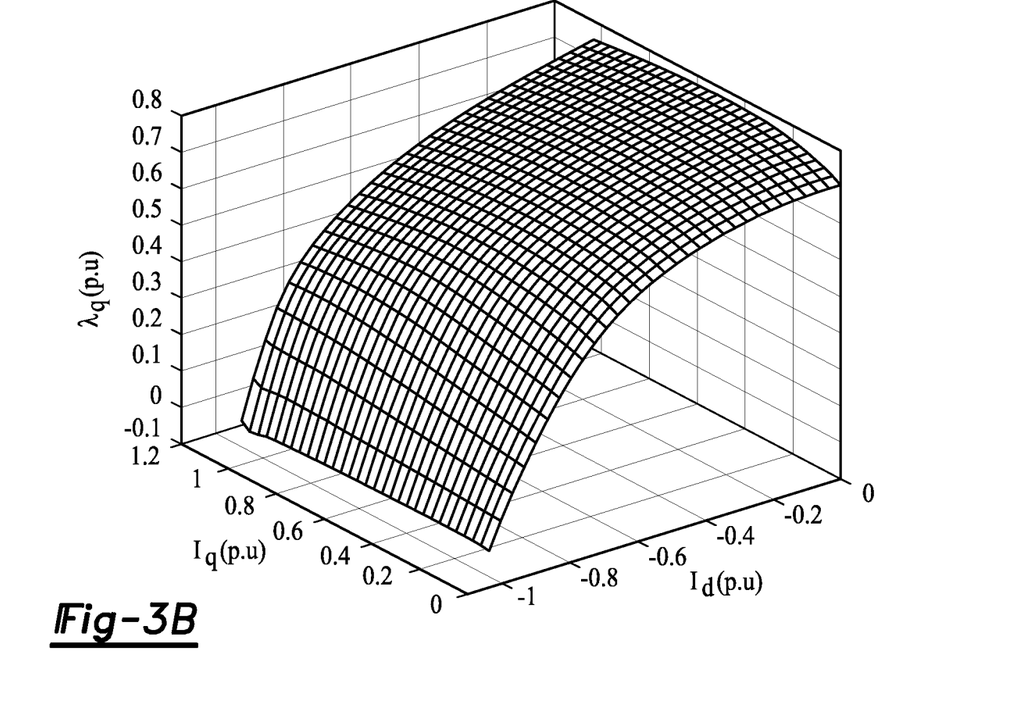

Referring briefly to FIGS. 3A and 3B, unlike a symmetric/non-salient machine for which flux saturation properties would change linearly with changing d-axis and q-axis currents, the present AC motor 13 of FIGS. 1 and 2 is asymmetric/salient. The AC motor 13 as contemplated herein will therefore experience non-linear flux saturation, i.e., the physical plant of FIG. 2 has a time constant $\tau=L/R$ that is itself asymmetric on the d-axis relative to the q-axis.

The controller 50 of the present disclosure virtually translates t in the control logic 50L to make the time constant symmetric. Thus, the controller 50 as contemplated herein controls the AC motor 13 so that the AC motor 13 behaves like a symmetric machine in spite of its asymmetric construction.

Discrete-time Modeling of an AC Machine: the AC motor 13 of FIGS. 1 and 2 is modeled herein using real space vectors. For an exemplary interior permanent magnet (IPM) machine, for instance, the stator current vector in the rotor reference frame is defined as $I_{dq}=[I_d \ I_q]^T$, where $I_d$ and $I_q$ are the individual components of the vector and the matrix is transposed by superscript T. The convention of bold text being indicative of a vector quantity is followed below. The notation for stationary reference frame is depicted as $\alpha\beta$. For example, the stator current vector in a stationary reference frame is defined as $I_{\alpha\beta}=[I_\alpha \ I_\beta]^T$. The identity matrix, orthogonal rotation matrix, and the zero matrix are then defined as:

$$1 = \begin{bmatrix} 1 & 0 \\ 0 & 1 \end{bmatrix} \ j = \begin{bmatrix} 0 & -1 \\ 1 & 0 \end{bmatrix} \ O = \begin{bmatrix} 0 & 0 \\ 0 & 0 \end{bmatrix} \quad (1)$$

The voltage equation in the rotor's rotating reference frame is given by:

$$\frac{d\lambda_{dq}}{dt} = V_{dq} - RI_{dq} - j\omega_e \lambda_{dq} \quad (2)$$

where $V_{dq}=[V_d \ V_q]^T$ is the voltage vector, $I_{dq}=[I_d \ I_q]^T$ is the current vector, R is the stator resistance, $\lambda_{dq}=[\lambda_d \lambda_q]^T$ is the flux-linkage vector, and ωe is the electrical angular speed of the rotor. The flux linkages $\lambda_d$ and $\lambda_q$ represented in FIGS. 3A and 3B are functions of time and in other words functions of $I_{dq}$, electrical angular position $\theta_e$ of rotor due to spatial harmonics in the stator-rotor airgap, and temperature Tr, i.e.:

$$\lambda_{dq} = [\ \lambda_d(I_d, I_q, \theta_e, Tr) \ \lambda_q(I_d, I_q, \theta_e, Tr)\ ]^T \quad (3)$$

The effects of temperature are externally compensated by adjusting the current or flux commands to achieve the desired torque, and may be ignored when designing the proposed controller 50. Additionally, the variations in temperature appear as parameter uncertainties or disturbances to the current regulator 22. The effects of flux-linkage varying as a function of position ($\theta_e$) are ignored as the current regulator 22 is designed to control average stator currents. With that, the non-linear relationship between flux-linkage and currents considering saturation and cross-saturation effects is given by equation (4) below and shown in the flux maps of FIGS. 3A and 3B. These flux maps may be obtained from motor characterization or using finite element analysis (FEA) and used in the controller 50 in form of look-up tables.

$$\lambda_{dq} = [\ \lambda_d(I_d, I_q) \ \lambda_q(I_d, I_q)\ ]^T \quad (4)$$

The operating point model of equation (2) noted above, derived using a first order Taylor series expansion evaluated at the operating point, is given by equation (5) with the constant speed assumption:

$$\frac{d\Delta\lambda_{dq}}{dt} = \Delta V_{dq} - R\Delta I_{dq} - j\omega_e \Delta\lambda_{dq} \quad (5)$$

Figure 3C:
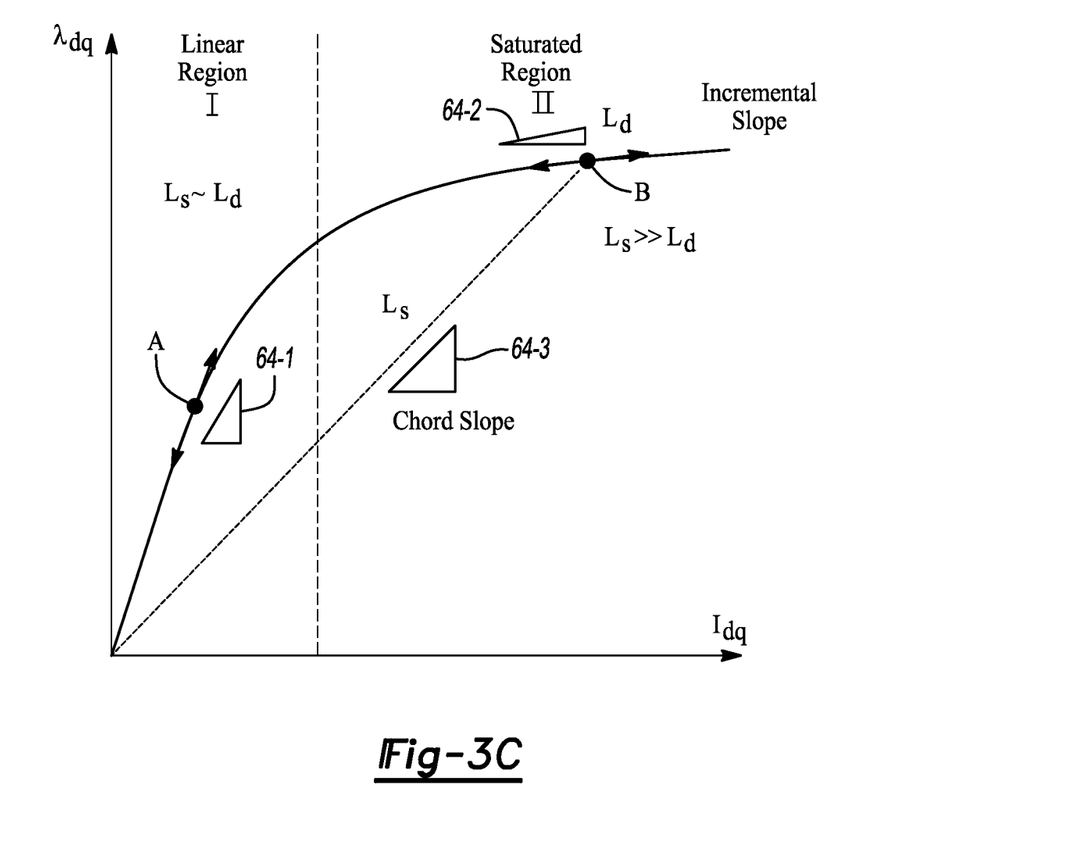
FIG. 3C depicts linear and saturated regions of operation of the AC motor in terms of dynamic and static inductances.

The dynamics of currents can be described by expressing the flux-linkage difference $\Delta\lambda_{dq}$ as a function of the current difference $\Delta I_{dq}$. Therefore, the dynamic inductances $L_d$ (set forth below as d-axis dynamic inductance $L_{dd}$ and q-axis dynamic inductance $L_{dq}$) as used herein is calculated from the flux gradient between two successive operating points of $I_{dq}$ as described in equation (6). As shown in FIG. 3C, the dynamic inductance $L_d$ is defined as the incremental slope of the flux-linkage curve and static inductance $L_s$ is defined as the chord slope, with chord slopes 64-1, 64-2, and 64-3 shown in FIG. 3C. When the AC motor 13 operates at a low excitation point A in Linear Region (I), the respective static and dynamic inductances $L_s$ and $L_d$ are substantially identical or similar, i.e., $L_s \sim L_d$. As $I_{dq}$ increases to point B, the AC motor 13 becomes heavily saturated, i.e., the AC motor 13 operates in a Saturated Region (II) of FIG. 3C with an incremental slope as indicated by chord slope 64-2. Here, dynamic inductance ($L_d$) exhibits a significant difference from the static inductance (Ls), i.e., $L_s >> L_d$.

In the present approach, dynamic inductances ($L_d$) are used to capture the saturation characteristics of the AC motor 13. The diagonal elements of $L_d$ in equation (6) are responsible for the current dynamics and the off-diagonal cross coupling elements describe the cross-saturation effects. Since the cross-saturation elements are typically smaller than the diagonal elements, they are omitted and considered as a disturbance to the current controller 22. With that, above-stated equation (6) simplifies to equation (7):

$$\Delta\lambda_{dq} = L_d \Delta I_{dq}, \text{ where } L_d = \begin{bmatrix} \frac{\partial \lambda_d}{\partial I_d} & \frac{\partial \lambda_q}{\partial I_d} \\ \frac{\partial \lambda_d}{\partial I_q} & \frac{\partial \lambda_d}{\partial I_q} \end{bmatrix} \quad (6)$$

$$\Delta\lambda_{dq} = L_d \Delta I_{dq}, \text{ where } L_d = \begin{bmatrix} L_{dd} & 0 \\ 0 & L_{dq} \end{bmatrix} = \begin{bmatrix} \frac{\partial \lambda_d}{\partial I_d} & 0 \\ 0 & \frac{\partial \lambda_q}{\partial I_q} \end{bmatrix} \quad (7)$$

The operating point linearized voltage equation from equation (5) may be written as equation (8) using relationship from equation (7):

$$\frac{d\Delta\lambda_{dq}}{dt} = \Delta V_{dq} - R L_d^{-1} \Delta\lambda_{dq} - j\omega_e \Delta\lambda_{dq} \quad (8)$$

Taking the Laplace transform of equation (8) with initial conditions and modeling voltage with a rotating latch as it is latched in stationary reference frame leads to equation (9):

$$s\Delta\lambda_{dq}(s) - \Delta\lambda_{dq}(0) = \frac{\Delta V_{dq}(0)}{sI + j\omega_e} - RL_d^{-1}\Delta\lambda_{dq}(s) - j\omega_e \Delta\lambda_{dq}(s) \quad (9)$$

Defining $\tau_{dq}$ and $\tau_w$ as time constants in the following equations (10) and (11) then allows for above-stated equation (9) to be written as equation (12), and further writing it in partial fraction form as equation (13):

$$\tau_{dq}^{-1} = \begin{bmatrix} \tau_d^{-1} & 0 \\ 0 & \tau_q^{-1} \end{bmatrix} = RL_d^{-1} \quad (10)$$

$$\tau_w^{-1} = \tau_{dq}^{-1} + j\omega_e \quad (11)$$

$$\Delta\lambda_{dq}(s) = \frac{\Delta V_{dq}(0)}{(sI + j\omega_e)(s + \tau_w^{-1})} + \frac{\Delta\lambda_{dq}(0)}{(s + \tau_w^{-1})} \quad (12)$$

$$\Delta\lambda_{dq}(s) = \frac{-\frac{\Delta V_{dq}(0)}{\tau_{dq}^{-1}}}{(s + \tau_w^{-1})} + \frac{\frac{\Delta V_{dq}(0)}{\tau_{dq}^{-1}}}{(sI + j\omega_e)} + \frac{\Delta\lambda_{dq}(0)}{(s + \tau_w^{-1})} \quad (13)$$

In order to return to the time domain, an inverse Laplace transform of equation (13) is taken, which leads to equation (14) and is further discretized for single time step leading to equation (15):

$$\Delta\lambda_{dq}(t) = \frac{-\Delta V_{dq}(0)}{\tau_{dq}^{-1}} e^{-\tau_w^{-1}t} + \frac{\Delta V_{dq}(0)}{\tau_{dq}^{-1}} e^{-j\omega_e t} + \Delta\lambda_{dq}(0)e^{-\tau_w^{-1}t} \quad (14)$$

$$z\Delta\lambda_{dq}(z) = \frac{\Delta V_{dq}(z)}{\tau_{dq}^{-1}}\left(e^{-j\omega_e T_s} - e^{-\tau_w^{-1}T_s}\right) + \Delta\lambda_{dq}(z)e^{-\tau_w^{-1}T_s} \quad (15)$$

Using the relationship between flux $\lambda_{dq}$ and current $I_{dq}$ from equation (7), equation (15) simplifies to equation (16). A discrete-time AC machine plant model is obtained as equation (17):

$$L_d \Delta I_{dq}\left(z - e^{-\tau_w^{-1}T_s}\right) = \frac{\Delta V_{dq}(z)}{L_d \tau_{dq}^{-1}}\left(e^{-j\omega_e T_s} - e^{-\tau_w^{-1}T_s}\right) \quad (16)$$

$$G_{p,(z)} = \frac{\Delta I_{dq}(z)}{\Delta V_{dq}(z)} = \frac{\left(e^{-j\omega_e T_s} - e^{-\tau_w^{-1}T_s}\right)}{L_d \tau_{dq}^{-1}\left(z - e^{-\tau_w^{-1}T_s}\right)} \quad (17)$$

The above approach will now be described with reference to FIGS. 4-8.

Figure 4:
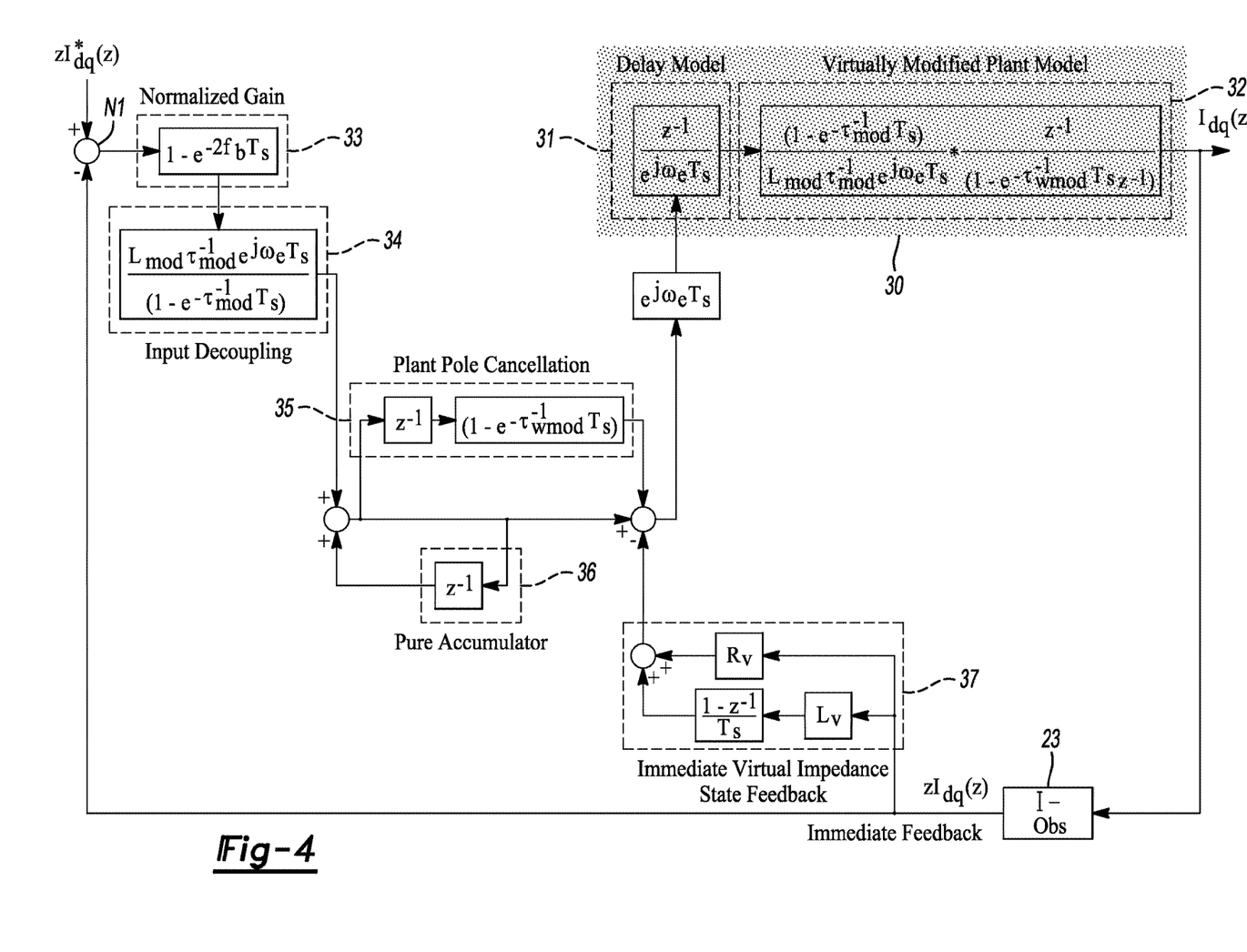
FIG. 4 is a schematic block diagram describing control of the electric drive system shown in FIG. 1.

Referring briefly to FIG. 4, the representative control logic 50L of FIG. 2 pertaining to current control as described above acts on a mathematical model of the physical plant whose operation is being controlled, in this case the AC motor 13. Thus, the control logic 50L uses a plant model block 30 of the AC motor 13, with the plant model block 30 including a delay model 31 and a plant model 32. The plant that is modeled via the plant model block 30 does not change. However, the present approach modifies the remainder of the control logic 50L. This occurs via a normalized gain block 33, an input coupling block 34, a plant pole cancellation block 35, an accumulator 36, and a state feedback block 37 providing immediate virtual impedance state feedback.

As part of the present approach, the controller 50 of FIGS. 1 and 2 may develop a linearized operating point discrete model of the AC motor 13 with accurate latch, discrete delays, and saturation characteristics. This approach will now be described in a series of discrete actions or steps.

STEP 1—Plant Modeling: the controller 50 could establish the following relationship according to equation (17) as set forth above:

$$G_{p,(z)} = \frac{\Delta I_{dq}(z)}{\Delta V_{dq}(z)} = \frac{\left(1 - e^{-\tau_{dq}^{-1}T_s}\right)}{L_d \tau_{dq}^{-1} e^{j\omega_e T_s}} * \frac{z^{-1}}{\left(1 - e^{-\tau_w^{-1}T_s}z^{-1}\right)} \quad (18)$$

where $T_S$ is the sampling time. Equation (18), which will be translated into block 32 of FIG. 4, thus serves as a model of the physical plant. Within the scope of the disclosure, the time constant $\tau$ will be virtually modified in the control logic 50L.

STEP 2—Virtual Modification: using the virtual resistance ($R_v$) and virtual inductance ($L_v$) vectors shown below in equation (19) leads to a virtually-translated AC machine in equation (20):

$$R_v = \begin{bmatrix} R_{vd} & 0 \\ 0 & R_{vq} \end{bmatrix} \quad (19)$$

and $$L_v = \begin{bmatrix} L_{vd} & 0 \\ 0 & L_{vq} \end{bmatrix}$$

$$\tau_{mod}^{-1} = R_{mod} L_{mod}^{-1} = \begin{bmatrix} R_{vd}L_d^{-1} & 0 \\ 0 & R_{vq}L_q^{-1} \end{bmatrix}$$

and $$\tau_{wmod}^{-1} = \tau_{mod}^{-1} + j\omega_e$$

where $$R_{mod} = R_v + R*I = \begin{bmatrix} R_{vd} + R & 0 \\ 0 & R_{vq} + R \end{bmatrix},$$

and where $$L_{mod} = L_v + L_d = \begin{bmatrix} L_{dd} + L_{vd} & 0 \\ 0 & L_{qd} + L_{vq} \end{bmatrix}.$$

Thus:

$$G_{pmod,(z)} = \frac{\Delta I_{dq}(z)}{\Delta V_{dq}(z)} = \frac{\left(1 - e^{-\tau_{mod}^{-1}T_s}\right)}{L_{mod} \tau_{mod}^{-1} e^{j\omega_e T_s}} * \frac{z^{-1}}{\left(1 - e^{-\tau_{wmod}^{-1}T_s}z^{-1}\right)} \quad (20)$$

which corresponds to model 32 in FIG. 4.

STEP 3—Time Constant Modification per Operating Point: The desired time constant ($\tau_{mod}$) value is then set as a function of the torque and speed of the AC motor 13 of FIGS. 1 and 2 to allow for targeting or configurable disturbance rejection capability based on torque and speed region is shown in equation (21). That is, the approach modifies the numerator or denominator of L/R so that $L_d/R$ and $L_q/R$ are the same. For example, at low speeds of the AC motor 13, the controller 50 may require a higher stiffness (a lower $\tau_{mod}$) or higher damping or disturbance rejection capability than at higher speeds, e.g., to suppress driveline resonances that appears as a voltage or back-emf disturbance. At higher speeds, inertia filters out drive line disturbances and the stiffness may be set lower (higher $\tau_{mod}$) to avoid inducing noise, vibration, and harshness (NVH) effects.

Another control degree of freedom is afforded to the controller 50 with the use of configurable virtual inductance ($L_v$) that enables disturbance rejection at higher frequencies in equation (22) below. This occurs as a function of torque and speed in the envisioned embodiments. Once the virtual inductance vector is set, the virtual resistance vector of equation (23) is recalculated based on the desired virtually-modified target time constant ($\tau_{mod}$) from equations (21) and (22):

$$\tau_{mod} = N(T^*, \omega_e) * T_s \quad (21)$$

Virtual resistance ($R_v$) and virtual inductance ($L_v$) vectors allow for selective operating point-based disturbance rejection for low frequency and high frequency, respectively. These are set based on equations (21) and (22):

$$L_v = K(T^*, \omega_e) * L_d \quad (22)$$

where $$K(T^*, \omega_e) = \begin{bmatrix} K_d(Tq, \omega_e) & 0 \\ 0 & K_q(T^*, \omega_e) \end{bmatrix}.$$

Here, K is a scalar value that may range from (0-1), implying that a percentage of actual inductance is used to determine the virtual inductance as modified:

$$R_v = \begin{bmatrix} R_{vd} & 0 \\ 0 & R_{vq} \end{bmatrix} = \frac{L_{mod}}{\tau_{mod}} - R * I \quad (23)$$

Thus, using the disclosed virtual translation allows the controller 50 to make τ symmetric. With two degrees of freedom, the virtual inductance $L_v$ could be modified to reject higher-frequency disturbances. The virtual resistance $R_v$ likewise could be modified to reject lower-frequency disturbances. $R_v$ and $L_v$ are thus usable herein as adjustable "handles" that the controller 50 may use in real-time to control operation and tune performance of the AC motor 13.

STEP 4—Pole-placement: a pole placement-type control scheme may then be designed as follows:

$$G_c(z) = \frac{\Delta V_{dq}(z)}{\Delta I_{dq}(z)} = \left(1 - e^{-(2\pi f_b T_s)}\right) \frac{L_{mod} \tau_{mod}^{-1} e^{j\omega_e T_s}\left(1 - e^{-\tau_{wmod}^{-1} T_s} z^{-1}\right)}{\left(1 - e^{-\tau_{mod}^{-1} T_s}\right)\left(1 - z^{-1}\right)}$$

$$G_{pd}(z) = \frac{z^{-1}}{e^{j\omega_e T_s}}$$

$$\frac{I_{dq}^*(z)}{I_{dq}(z)} = \frac{G_c(z) * G_{pd}(z) * G_{pmod,(z)}}{1 + G_c(z) * G_{pd}(z) * G_{pmod,(z)}}$$

$$\frac{I_{dq}^*(z)}{I_{dq}(z)} = \frac{\frac{\left(1 - e^{-(2\pi f_b T_s)}\right)}{(z-1)} * \frac{1}{z}}{1 + \frac{\left(1 - e^{-(2\pi f_b T_s)}\right)}{(z-1)} * \frac{1}{z}} = \frac{\left(1 - e^{-(2\pi f_b T_s)}\right)}{z^2 - z + \left(1 - e^{-(2\pi f_b T_s)}\right)}$$

with the above closed loop response having one sample delay. Here, $f_b$ is the bandwidth of the controller 50. A closed-loop response with the current observer 23 of FIG. 4 ($1^{st}$ order without delay) may be represented as:

$$\frac{I_{dq}^*(z)}{I_{dq}(z)} = \frac{1 - e^{-(2\pi f_b T_s)}}{z - e^{-(2\pi f_b T_s)}}.$$

Figure 5A:
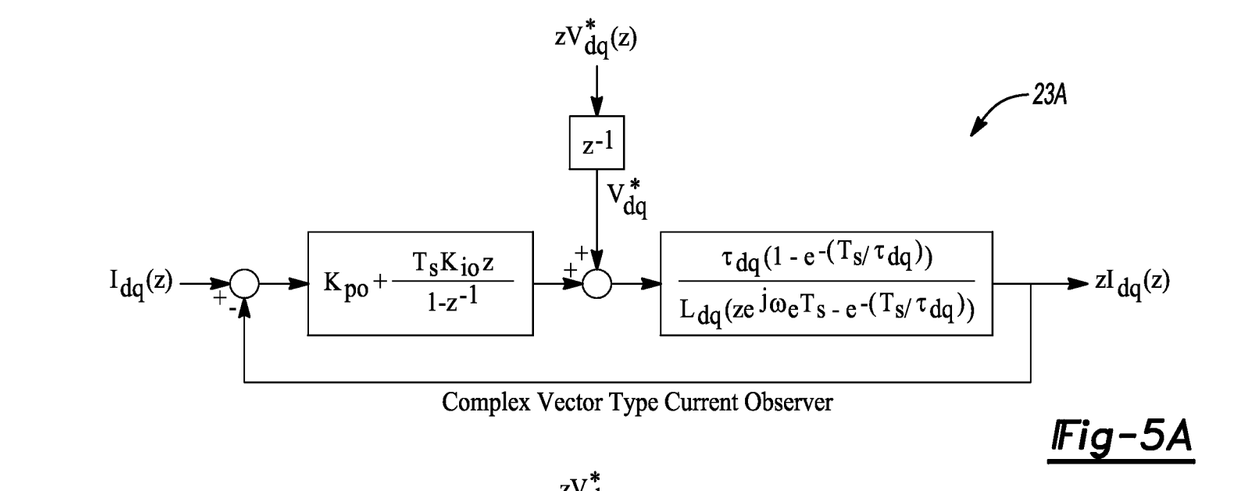
FIGS. 5A and 5B illustrate possible embodiments of a current observer usable as part of the controller illustrated in FIGS. 2 and 4.
Figure 5B:
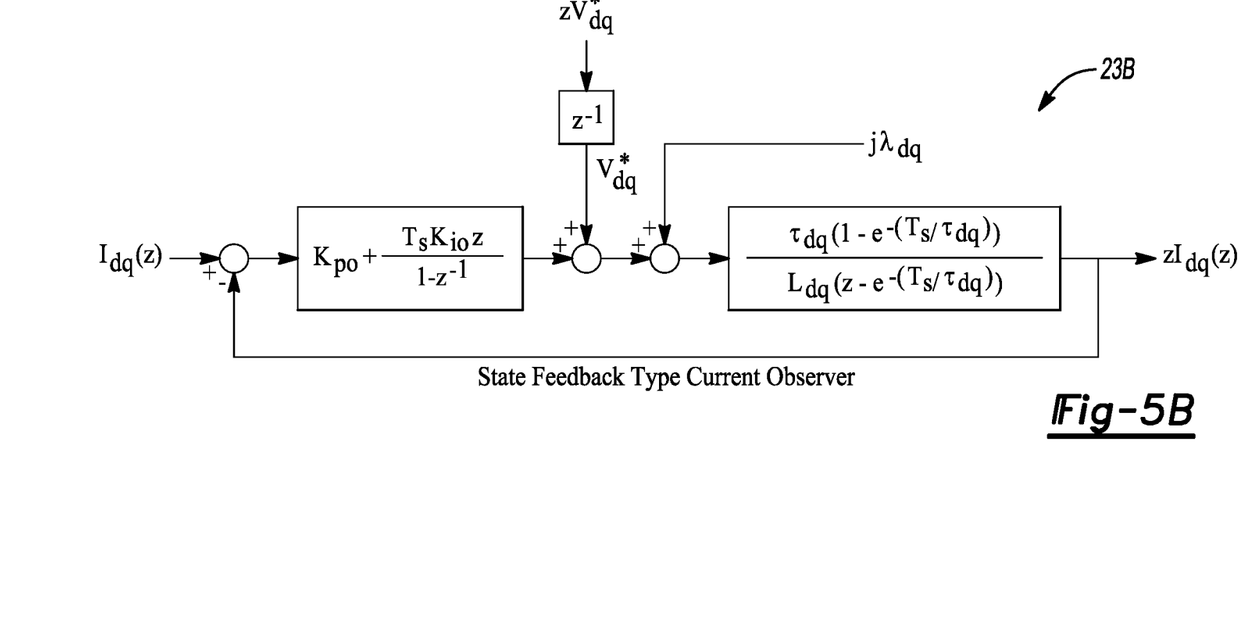

Important characteristic of discrete-time implementation is that a computational delay (an actuator delay) of one sample period typically exists in the control loop. The current regulator's $G_{c(z)}$ calculations are based on the current sample instance of measured current values $I_{dq}(z)$. However, the voltage output of the regulator corresponds to the next sample instance ($zV_{dq}(z)$) value rather than the current sample ($V_{dq}(z)$). Virtual resistance ($R_v$) and virtual inductance ($L_v$) damping voltage may be calculated based on current sample instance value, and then applied to a next sample instance voltage command, thereby causing a delayed state feedback response. This causes degraded and oscillatory behavior at low fundamental-to-sampling ratios. It is therefore desirable to obtain and use next sample instance current values $zI_{dq}(z)$ in the current regulator 22 of FIG. 2 and for virtual resistance damping. Current observers used to implement the current observer 23 of FIG. 2 may be designed in complex vector style (block diagram 23A) and state feedback style (block diagram 23B) as illustrated in FIGS. 5A and 5B, respectively, with $K_{p0}$ and $K_{i0}$ being respective proportional and integral constants.

Figure 6:
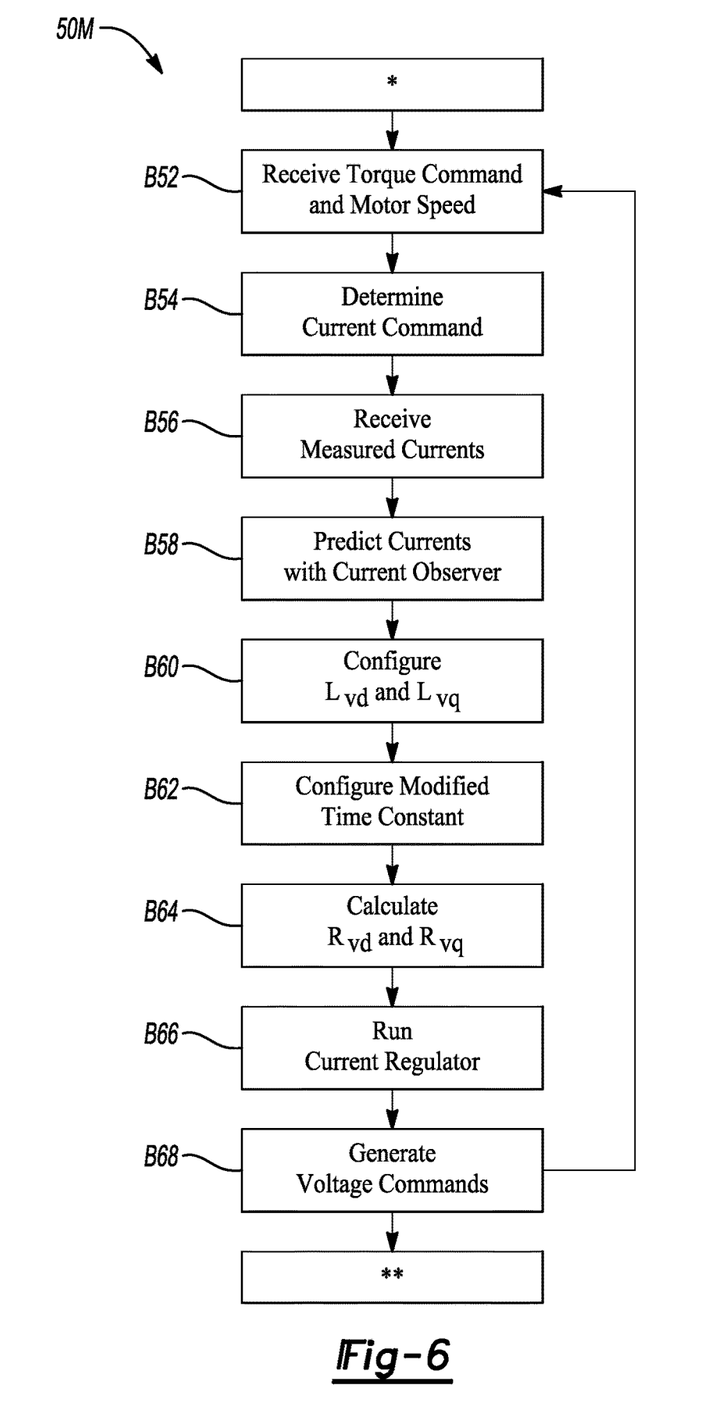
FIG. 6 is a flow chart describing an embodiment of a method for controlling the electric drive system of FIG. 1 in accordance with the present disclosure.

Referring now to FIG. 6, the method 50M is illustrated as a series of discrete logic blocks for clarity, with each of the blocks of being implemented as computer-readable code or instructions executable by the processor 52 of FIG. 1 to allow the controller 50 to perform the indicated functions.

Upon initialization (*) of the controller 50, e.g., after a key-on event in which the representative motor vehicle 11 of FIG. 1 is started directly or remotely by an operator, the controller 50 at block B52 receives the input signals (CCI). In a possible embodiment, block B52 entails receiving, calculating, or otherwise determining the torque command (T*) and the measured motor speed ($\omega_e$) shown in FIG. 2. The controller 50 is thus aware of the operating point of the AC motor 13. The method 50M then proceeds to block B54.

At block B54, the controller 50 next determines the dq-axes current commands, i.e., $zI^*_{dq}(z)$ from the CGM block 20 of FIG. 2. The method 50M proceeds to block B56 after this value has been ascertained.

At block B56 of FIG. 6, the controller 50 receives the measured phase currents, i.e., $I_{abc}$ of FIG. 2. These values are fed into the current observer 23 as the method 50M proceeds to block B58.

Block B58 of the method 50M is then performed by the controller 50 of FIG. 1 to predict dq currents, i.e., $zI_{dq}(z)$. This action occurs using the current observer 23 of FIG. 2 as described above. The method 50M continues to block B60.

Figure 7:
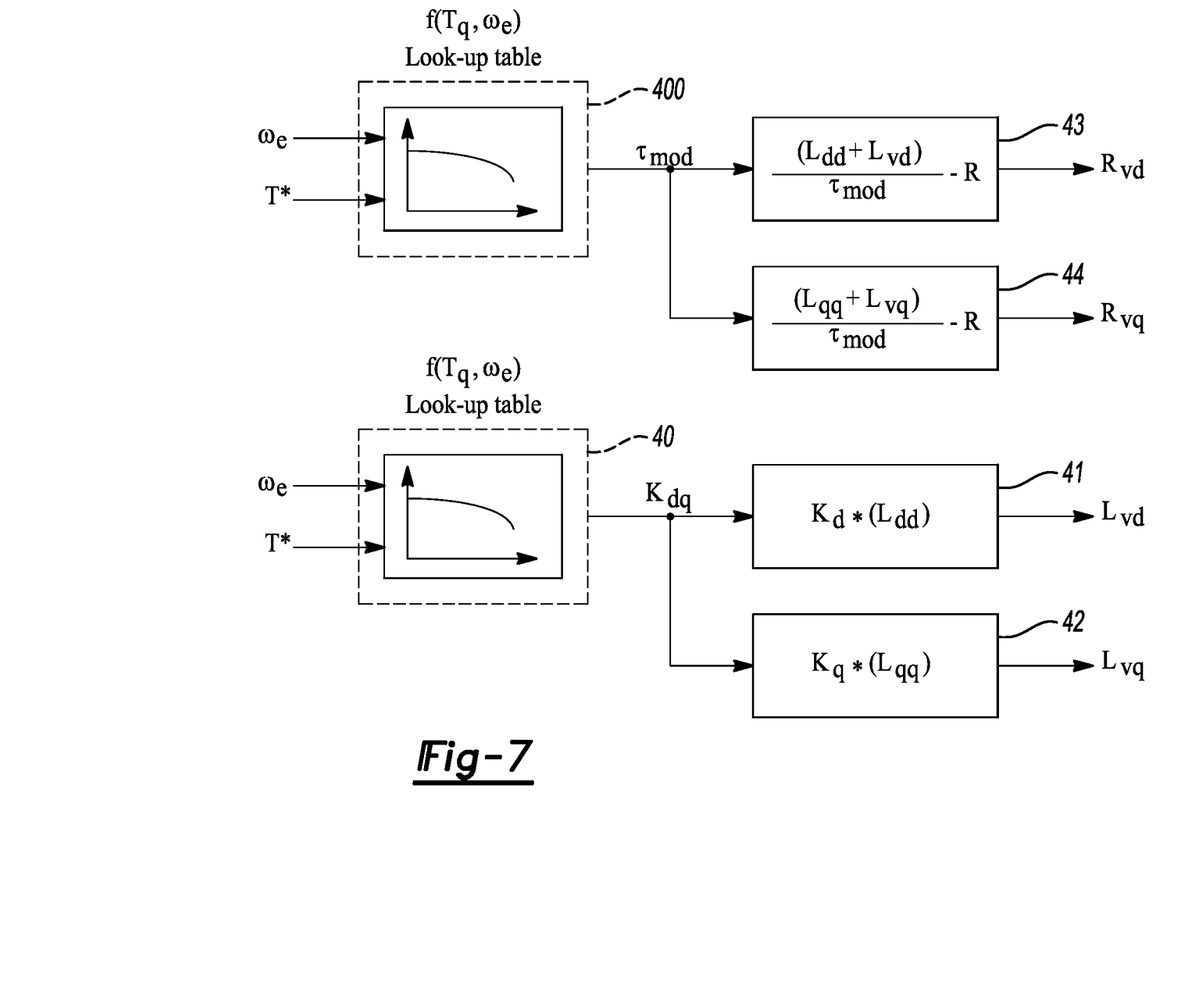
FIG. 7 is a block diagram describing lookup table-based determinations of virtual q-axis and d-axis resistance and inductance values for use by the controller of FIGS. 2 and 4.

Block B60 includes configuring the virtual d-axis and q-axis inductances, i.e., $L_{vd}$ and $L_{vq}$, respectively. Referring briefly to FIG. 7, block B60 may include accessing a first lookup table 40 indexed by the torque command (T*) and the angular speed ($\omega_e$) to determine constant multiplier $K_{dq}$. Constituent d-axis and q-axis constant multiplier $K_d$ and $K_q$ are then processed via calculation blocks 41 and 42 to derive the virtual d-axis inductance ($L_{vd}$) and the virtual q-axis inductance ($L_{vq}$). For instance, block 41 may be implemented as:

$$L_{vd} = K_d * L_{dd}$$

where $L_{dd}$ once again is the dynamic inductance for the d-axis. Similarly, block 42 could be implemented as:

$$L_{vq} = K_q * L_{qq}$$

The method 50M then proceeds to block B62.

Block B62 includes configuring the symmetric modified time constant, i.e., $\tau_{mod}$. Referring again to FIG. 7, block B62 may include accessing a second lookup table 400 indexed by the torque command (T*) and angular speed ($\omega_e$) to determine $\tau_{mod}$. The modified time constant ($\tau_{mod}$) as extracted from the lookup table 400 is then temporarily stored in memory 54 of FIG. 1 as the controller 50 proceeds to block B64.

At block B64 of FIG. 6, the controller 50 calculates the d-axis and q-axis virtual resistances $R_{vd}$ and $R_{vq}$, respectively. As shown in blocks 43 and 44 of FIG. 7:

$$R_{vd} = \frac{(L_{dd} + L_{vd})}{\tau_{mod}} - R$$

$$R_{vq} = \frac{(L_{qq} + L_{vq})}{\tau_{mod}} - R$$

The method 50 of FIG. 6 then proceeds to block B66.

Block B66 entails running the current regulator 22 of FIG. 2 assuming the above-determined modified time constant $\tau_{mod}$, virtual resistances $R_{vd}$ and $R_{vq}$, and virtual inductances $L_{vd}$ and $L_{vq}$ in block 32 of FIG. 4. The method 50M then proceeds to block B68.

Block B68 of FIG. 6 includes generating the dq axes voltage commands V*αβ of FIG. 2 for control of the PIM 14. Switching operation of the PIM 14 in response to the switching control signals CC$_{14}$, i.e., S$_{abc}$ of FIG. 2, thus controls operation of the AC motor 13. The method 50M is complete (), or loops back to block B52 when the drive cycle remains active. The above approach thus allows the controller 50 to selectively reject a low-frequency disturbance of the electric drive system 10 by replacing the d-axis inductance (L$_d$) and/or the q-axis inductance (L$_q$) in the plant model 32 of FIG. 4 with the virtual d-axis inductance (L$_{vd}$) and/or the virtual q-axis inductance (L$_{vq}$) determined using the second lookup table 400, respectively, and to selectively reject a high-frequency disturbance of the electric drive system 10 by replacing the d-axis resistance (Ra) and/or the q-axis resistance (R$_q$) of the plant model 32 with the virtual d-axis resistance (R$_{vd}$) and/or the virtual q-axis resistance (R$_{vd}$) determined using the first lookup table 40**, respectively.

The method 50M of FIG. 6, when used in conjunction with the controller 50 of FIG. 1 and the control logic 50L described above with reference to FIGS. 2-5 and 7, facilitates expanded use of the AC motor 13, i.e., a representative asymmetric AC machine. As noted above, non-linearities of such machines due to saliency and flux saturation characteristics make asymmetric machines relatively difficult to analyze and control using classical motor control techniques. By virtually modifying the plant's time constant to make the time constant symmetric as set forth herein, the AC motor 13 is able to be constructed and used in higher-speed applications. Selective torque disturbance rejection at higher or lower frequencies is likewise enabled by manipulation of virtual inductances or resistances, which occurs independently on the d-axis and q-axis in an operating point-specific manner. These and other attendant benefits will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An electric drive system comprising:
   a direct current (DC) power supply;
   a power inverter module (PIM) connected to the DC power supply;
   an alternating current (AC) motor connected to the PIM and to a load, wherein the AC motor is a salient machine having an asymmetric time constant; and
   a controller programmed with control logic including a plant model of the electric drive system, wherein the plant model includes the asymmetric time constant, and wherein the controller is configured to selectively modify the asymmetric time constant via selective and independent manipulation of direct axis (d-axis) and quadrature axis (q-axis) inductance and resistance, on an operating point-specific basis, such that the asymmetric time constant is virtually translated in the control logic into a symmetric modified time constant by manipulating/adding virtual inductive and virtual resistive terms independently and per operating point of the AC motor, and to control the AC motor at the operating point using the symmetric modified time constant.

2. The electric drive system of claim 1, wherein the controller is configured to determine a torque command and an angular speed of the AC motor, and wherein the operating point of the AC motor includes the torque command and the angular speed of the AC motor.

3. The electric drive system of claim 2, wherein the electric drive system is part of a mobile system aboard which the AC motor is operable as a traction or propulsion motor.

4. The electric drive system of claim 2, wherein the controller includes a computer-readable storage medium that includes a first lookup table and a second lookup table each indexed by the torque command and the angular speed of the AC motor, and wherein:
   the symmetric modified time constant is selected by the controller from the first lookup table and used to calculate the virtual d-axis resistance and the virtual q-axis resistance as the virtual resistive terms; and
   a d-axis constant multiplier and a q-axis constant multiplier are selected by the controller from the second lookup table and used to calculate the virtual d-axis inductance and the virtual q-axis inductance as the virtual inductive terms.

5. The electric drive system of claim 4, wherein the controller is configured to calculate the virtual d-axis inductance and the virtual q-axis inductance by multiplying a d-axis dynamic inductance and a q-axis dynamic inductance by the d-axis constant multiplier and the q-axis constant multiplier, respectively.

6. The electric drive system of claim 4, wherein the controller is configured to selectively reject a low-frequency disturbance of the electric drive system by replacing the d-axis inductance and/or the q-axis inductance in the plant model with the virtual d-axis inductance and/or the virtual q-axis inductance from the second lookup table, respectively.

7. The electric drive system of claim 4, wherein the controller is configured to selectively reject a high-frequency disturbance of the electric drive system by replacing the d-axis resistance and/or the q-axis resistance of the plant model with the virtual d-axis resistance and/or the virtual q-axis resistance from the first lookup table, respectively.

8. A method for controlling an electric drive system having an alternating current (AC) motor connected to a power inverter module (PIM) and to a load, wherein the AC motor is a salient machine, the method comprising:

determining an operating point of the AC motor;
selectively modifying an asymmetric time constant of the AC motor at the operating point of the AC motor in control logic of the controller, the control logic including a plant model of the electric drive system, including selectively and independently manipulating a direct axis (d-axis) and quadrature axis (q-axis) inductance and resistance via the controller, such that the asymmetric time constant is virtually translated in the control logic into a symmetric modified time constant by manipulating/adding virtual inductive and virtual resistive terms independently and per operating point of the AC motor; and
controlling the AC motor at the operating point using the symmetric modified time constant.

9. The method of claim 8, further comprising:
determining a torque command and an angular speed of the AC motor via the controller; and
using the torque command and the angular speed as the operating point of the AC motor.

10. The method of claim 9, wherein the electric drive system is part of a motor vehicle aboard which the AC motor is operable as a traction or propulsion motor, the method further comprising:
mapping a pedal position of the motor vehicle to the torque command via the controller;
translating the torque command to a required axle torque command of the motor vehicle; and
propelling the motor vehicle via the traction or propulsion motor in response to the required axle torque command.

11. The method of claim 9, wherein the controller includes a computer-readable storage medium that includes a first lookup table and a second lookup table indexed by the torque command and the angular speed of the AC motor, the method further comprising:
selecting the symmetric modified time constant from the first lookup table;
calculating a virtual d-axis resistance and a virtual q-axis resistance as the virtual resistive terms using the symmetric modified time constant;
selecting a d-axis constant multiplier and a q-axis constant multiplier from the second lookup table; and
calculating a virtual d-axis inductance and a virtual q-axis inductance as the virtual inductive terms using the axis constant multiplier and the q-axis constant multiplier.

12. The method of claim 11, further comprising:
calculating the virtual d-axis inductance and the virtual q-axis inductance by multiplying a d-axis dynamic inductance and a q-axis dynamic inductance by the d-axis constant multiplier and the q-axis constant multiplier, respectively.

13. The method of claim 12, further comprising:
selectively rejecting a low-frequency disturbance of the electric drive system, via the controller, including replacing the d-axis inductance and/or the q-axis inductance in the plant model with the virtual d-axis inductance and/or the virtual q-axis inductance from the second lookup table, respectively.

14. The method of claim 12, further comprising:
selectively rejecting a high-frequency disturbance of the electric drive system, via the controller, by replacing the d-axis resistance and/or the q-axis resistance of the plant model with the virtual d-axis resistance and/or the virtual q-axis resistance from the first lookup table, respectively.

15. A motor vehicle comprising:
a vehicle body;
one or more road wheels connected to the vehicle body; and
an electric drive system connected to the vehicle body, the electric drive system including:
a traction battery pack;
a power inverter module (PIM) connected to the traction battery pack;
an alternating current (AC) traction motor connected to the PIM and to one or more of the road wheels, wherein the AC traction motor is a salient machine; and
a controller programmed with control logic including a plant model of the electric drive system, wherein the plant model includes an asymmetric time constant of the AC motor, and wherein the controller is configured to:
determine a torque command and an angular speed of the AC traction motor as an operating point thereof;
selectively modify the asymmetric time constant at the operating point by selectively and independently manipulating a direct axis (d-axis) and quadrature axis (q-axis) inductance and resistance of the AC traction motor, such that the asymmetric time constant is virtually translated in the control logic into a symmetric modified time constant by manipulating/adding virtual inductive and virtual resistive terms independently and per operating point of the AC motor; and
control the AC traction motor at the operating point using the symmetric modified time constant.

16. The motor vehicle of claim 15, wherein the controller is configured to:
map a pedal position to a torque command; and
translate the torque command to a required axle torque command for powering one or more of the road wheels via the AC traction motor.

17. The motor vehicle of claim 15, wherein the controller includes a computer-readable storage medium that includes a first lookup table and a second lookup table indexed by the torque command and the angular speed of the AC motor, and wherein the controller is configured to:
select the symmetric modified time constant from the first lookup table and calculate a virtual d-axis resistance and a virtual q-axis resistance as the virtual resistive terms using the symmetric modified time constant; and
select a d-axis constant multiplier and a q-axis constant multiplier from a second lookup table and use the d-axis constant multiplier and a q-axis constant multiplier to calculate a virtual d-axis inductance and a virtual q-axis inductance as the virtual indictive terms.

18. The motor vehicle of claim 17, wherein the controller is configured to calculate the virtual d-axis inductance and the virtual q-axis inductance by multiplying a d-axis dynamic inductance and a q-axis dynamic inductance by the d-axis constant multiplier and the q-axis constant multiplier, respectively.

19. The motor vehicle of claim 17, wherein the controller is configured to selectively reject a low-frequency disturbance of the electric drive system by replacing the d-axis inductance and/or the q-axis inductance in the plant model with the virtual d-axis inductance and/or the virtual q-axis inductance determined using the second lookup table, respectively.

20. The motor vehicle of claim 17, wherein the controller is configured to selectively reject a high-frequency disturbance of the electric drive system by replacing the d-axis resistance and/or the q-axis resistance of the plant model with the virtual d-axis resistance and/or the virtual q-axis resistance determined using the first lookup table, respectively.

\* \* \* \* \*